(12) United States Patent
Kaneyasu

(10) Patent No.: US 8,330,707 B2
(45) Date of Patent: Dec. 11, 2012

(54) LIGHTING DEVICE FOR COLD-CATHODE TUBE AND CONTROL METHOD THEREOF

(75) Inventor: Isamu Kaneyasu, Kato (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 12/696,744

(22) Filed: Jan. 29, 2010

(65) Prior Publication Data

US 2010/0128016 A1 May 27, 2010

Related U.S. Application Data

(63) Continuation of application No. PCT/JP2007/001054, filed on Sep. 28, 2007.

(51) Int. Cl.
*G09G 3/36* (2006.01)
(52) U.S. Cl. ......... 345/102; 349/70; 362/97.2; 345/74.1
(58) Field of Classification Search .............. 345/76–84, 345/87, 102, 204, 211, 74.1; 315/119, 169.3, 315/246, 250, 254, 276, 291, 307, 308; 349/70; 362/97.1–97.3
See application file for complete search history.

(56) References Cited

U.S. PATENT DOCUMENTS

| | | | | |
|---|---|---|---|---|
| 4,107,771 A | * | 8/1978 | Anderson et al. | 363/58 |
| 4,626,953 A | * | 12/1986 | Nilssen | 361/63 |
| 7,710,077 B2 | * | 5/2010 | Zeng et al. | 320/136 |
| 8,093,839 B2 | * | 1/2012 | Jin et al. | 315/308 |
| 2002/0101696 A1 | | 8/2002 | Noma et al. | 361/88 |
| 2007/0285381 A1 | * | 12/2007 | Gong et al. | 345/102 |
| 2009/0237346 A1 | * | 9/2009 | Bai et al. | 345/102 |

FOREIGN PATENT DOCUMENTS

| | | |
|---|---|---|
| JP | 7-065972 A | 3/1995 |
| JP | 2000-243586 A | 9/2000 |
| JP | 3074778 U | 1/2001 |
| JP | 2002-063996 A | 2/2002 |
| JP | 2002-110388 A | 4/2002 |
| JP | 2002-141186 A | 5/2002 |
| JP | 2007-115568 A | 5/2007 |

OTHER PUBLICATIONS

Notification of Transmittal of Translation of the International Preliminary Report on Patentability (Form PCT/IB/338) of International Application No. PCT/JP2007/001054 mailed May 14, 2010, with Forms PCT/IB/373 and PCT/ISA/237.
International Search Report of PCT/JP2007/001054, mailing date of Dec. 11, 2007.

* cited by examiner

*Primary Examiner* — Lun-Yi Lao
*Assistant Examiner* — Tom Sheng
(74) *Attorney, Agent, or Firm* — Westerman, Hattori, Daniels & Adrian, LLP

(57) ABSTRACT

A lighting device for a cold-cathode tube includes an inverter that supplies a current through the cold-cathode tube, an operation portion through which a luminance adjustment is performed, an inverter control circuit that controls the inverter in accordance with a luminance adjustment value adjusted through the operation portion so as to change the current flowing through the cold-cathode tube, and a protective circuit that stops operation of the inverter when the current flowing through the cold-cathode tube becomes smaller than a predetermined set value. The protective circuit of the lighting device is controlled in such a way that the protective circuit does not operate when the luminance adjustment value adjusted through the operation portion is smaller than a luminance threshold value.

3 Claims, 5 Drawing Sheets

FIG. 5

| DUTY CYCLE (%) | 5 | 10 | 15 |
|---|---|---|---|
| LUMINANCE (cd/m$^2$) | 0.14 | 3.9 | 8.6 |
| SURFACE CONDITION OF PCB IF IT IS NOT CARBONIZED, FIGURES INDICATE TEMPERATURE ($\Delta$T°C) OF PATTERN NEAR DISCHARGED SPOT | 3.8 | 27 | PRINTED CIRCUIT BOARD CARBONIZED | ically reduced, which may activate the protective circuit

LIGHTING DEVICE FOR COLD-CATHODE TUBE AND CONTROL METHOD THEREOF

CROSS-REFERENCE TO RELATED APPLICATIONS

This application is a continuing application, filed under 35 U.S.C. §111(a), of International Application PCT/JP2007/001054, filed on Sep. 28, 2007, the entire contents of which are incorporated herein by reference.

FIELD

The embodiments discussed herein are related to a lighting device for a cold-cathode tube, a control method thereof, and a liquid-crystal display device.

BACKGROUND

A liquid-crystal display device is widely used as a monitor of a flat-screen TV set and a personal computer. The liquid-crystal display device is provided with a liquid-crystal panel, a cold-cathode tube arranged as a backlight for the liquid-crystal panel, and a lighting device for driving the cold-cathode tube.

Conventionally, the lighting device for the cold-cathode tube is formed of an inverter for supplying driving voltage to the cold-cathode tube, a dimmer circuit for adjusting luminance intensity of the cold-cathode tube, a current detector for detecting a load condition of the cold-cathode tube, a protective circuit for stopping supply of the driving voltage when the cold-cathode tube becomes a no-load condition, a control circuit for controlling an output of the inverter so that the luminance of the cold-cathode tube is maintained at a level adjusted by the dimmer circuit, and so on (Japanese Laid-open Patent Publication No. 2007-115568).

When the current detector detects that an amount of current flowing through the cold-cathode tube becomes smaller than a preset value, the protective circuit halts the operation of the inverter by assuming that a lead wire of the cold-cathode tube is broken or connectors are poorly fitted.

The inverter is configured of a piezoelectric transformer, a voltage-controlled oscillator circuit, an oscillation frequency control circuit, a driving circuit for driving the piezoelectric transformer, and so on (Japanese Laid-open Patent Publication No. 2000-243586).

In a liquid-crystal display device used in offices, a luminance adjustment function is provided to thereby usually adjust the luminance level of 50% to 100% of the maximum luminance. In this way, the minimum adjustable luminance is set at about 50% of the maximum luminance.

However, in special-purpose applications, for example, a liquid-crystal display device for use in a marine radar, it is necessary to reduce the luminance considerably so that the liquid-crystal display device does not disturb the view for night navigation. For this purpose, it is necessary to arrange the luminance adjustment function to cover a wide range of adjustment such as 0.1% to 100% of the maximum luminance. In such a case, the minimum luminance will be set at an exceptionally low level of 0.1%.

Then, the current flowing through the cold-cathode tube is drastically reduced, which may activate the protective circuit so that supply of the driving voltage to the cold-cathode tube is halted. It is possible to detect, to a certain extent, a current when it is made smaller by lowering the setting value of the current detector. However, when the luminance is adjusted at an exceptionally low level such as 1% or 0.1% of the maximum luminance, the current flowing through the cold-cathode tube becomes very small. As a result, it becomes impossible to lower the setting value to such an extent, making it difficult for the current detector to detect the current accurately and for the protective circuit to function normally.

If the protective circuit is turned off or removed in order to prevent the protective circuit from behaving unsteadily, the protective circuit never functions even if the lead wire of a cold-cathode tube is broken or connectors are poorly fitted due to transportation or handling of the liquid-crystal display device. This causes the display device to display in low luminance or with flicker. Furthermore, using the display device in such a condition may lead to a more serious malfunction. In addition, such a condition may cause unsatisfactory detection of a broken lead wire or poor connection of the connectors when the products are inspected, which may eventually cause defective products by overlooking.

SUMMARY

According to one aspect of the invention, a lighting device for a cold-cathode tube includes an inverter that supplies a current through the cold-cathode tube, an operation portion through which a luminance adjustment is performed, an inverter control circuit that controls the inverter in accordance with a luminance adjustment value adjusted through the operation portion so as to change the current flowing through the cold-cathode tube, and a protective circuit that stops operation of the inverter when the current flowing through the cold-cathode tube becomes smaller than a predetermined set value. The protective circuit of the lighting device is controlled in such a way that the protective circuit does not operate when the luminance adjustment value adjusted through the operation portion is smaller than a luminance threshold value.

Since the luminance adjustment value adjusted by the user is compared with the luminance threshold value, it is possible to accurately compare the luminance threshold value, when it is exceptionally small, with the luminance adjustment value, and, when the luminance adjustment value becomes smaller than the luminance threshold value, it is possible to realize this fact accurately.

With this arrangement, even if the luminance threshold value is exceptionally low, it is possible to decide whether to make the protective circuit effective or ineffective, i.e., accurately switch between the effective state and the ineffective state of the protective circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table indicating a result of an experiment conducted on a printed circuit board by causing a discharge while a luminance adjustment value is changed.

DESCRIPTION OF EMBODIMENT(S)

Figure 1:
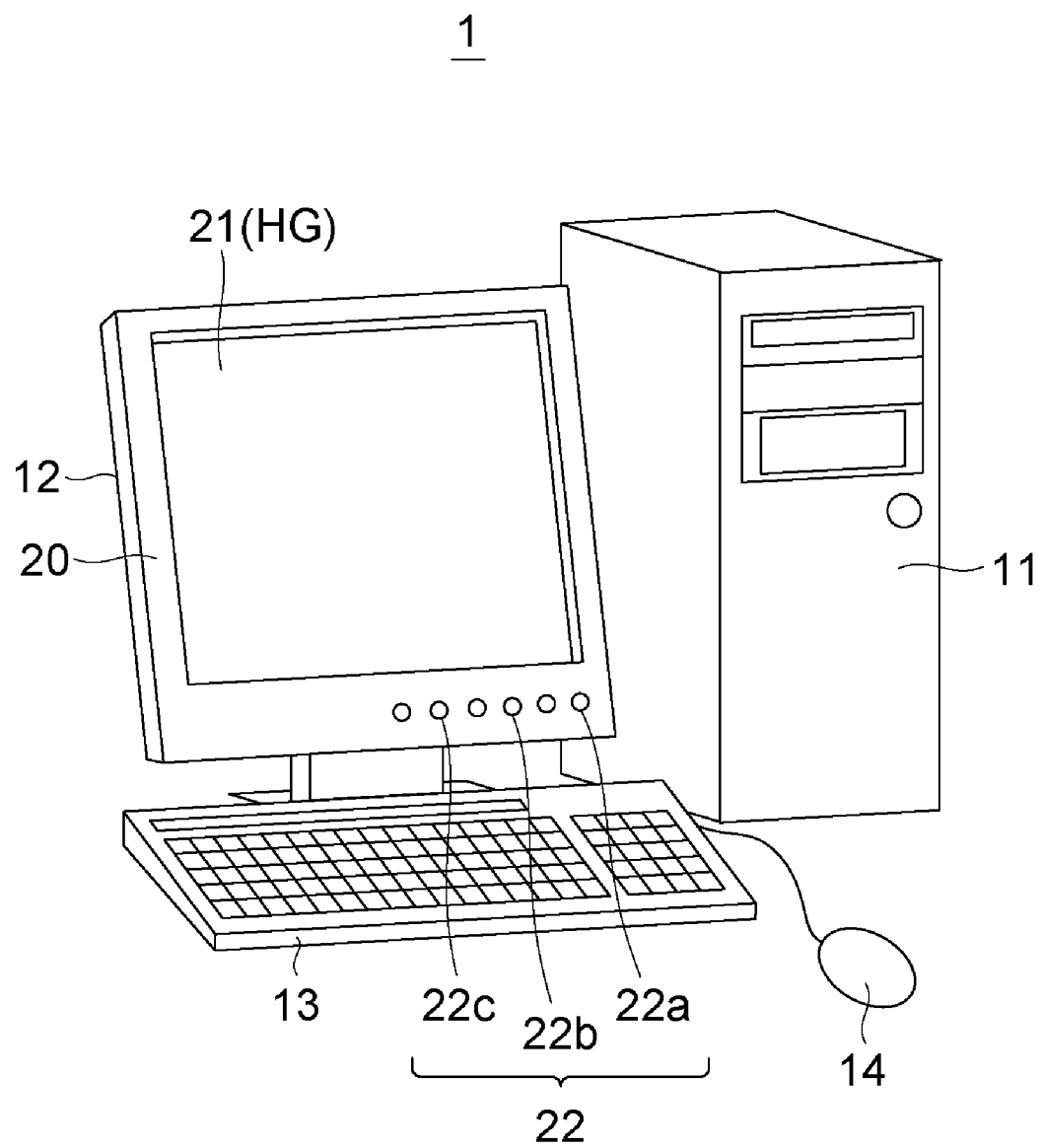
FIG. 1 is a diagram illustrating an example of a computer system using a liquid-crystal display device according to one embodiment.

In FIG. 1, a computer system 1 is provided with a computer 11, a liquid-crystal display device 12, a keyboard 13, a mouse 14, and so on. The computer 11 is provided with an MPU (Micro Processing Unit) or a CPU (Central Processing Unit), a memory, various types of interfaces, other peripheral devices, a magnetic disk unit, a DVD-ROM drive unit, and so on.

The liquid-crystal display device 12 displays, on a display screen HG of a liquid-crystal panel 21, various images or characters. Various operation buttons 22 are provided on a front surface of a frame 20. The operation buttons 22 include a power button 22a, a sound volume control button 22b, luminance adjustment buttons 22c, and the like.

The luminance adjustment buttons 22c are used by a user to adjust the luminance. Two buttons are provided as the luminance adjustment buttons, namely, one button for increasing a setting value for luminance when pressed and the other button for decreasing the setting value for luminance when pressed. A luminance adjustment value S1 represents the setting value for luminance that is set through the luminance adjustment buttons 22c. A range in which the setting value can be varied by operating the luminance adjustment buttons 22c is decided when the liquid-crystal display device is manufactured or designed.

In actual cases, a signal outputted from the luminance adjustment buttons 22c is fed into an MPU 30, whereupon the luminance adjustment value S1 is generated. In other words, the luminance adjustment value S1 is actually generated in the MPU 30 in such a way to realize luminance that the user desires in response to the operation of the luminance adjustment buttons 22c.

The luminance adjustment value S1 may be a ratio (percentage) of luminance to the maximum luminance, for example, 20%, 5%, 0.5%, or the like. Alternatively, the luminance adjustment value S1 may be a luminance value expressed in candela per square meter, for example, 3.9 $cd/m^2$, 0.5 $cd/m^2$, 0.05 $cd/m^2$, or the like. In addition, such a value may be a digital value directly expressing the luminance adjustment value S1 or coded digital data. In this embodiment, however, a description will be given, for the sake of convenience, by assuming that the luminance adjustment value S1 is directly outputted from the luminance adjustment buttons 22c.

It is also possible to provide the luminance adjustment buttons 22c with a circuit that produces the luminance adjustment value S1 to respond to an actual case. Alternatively, it is also possible to use an electronic component, as the luminance adjustment buttons 22c, that is capable of directly outputting the luminance adjustment value S1. As described above, the luminance adjustment buttons 22c alone, or the luminance adjustment buttons 22c and the MPU 30 combined together correspond to an operation portion in this embodiment.

A cold-cathode tube 23 (FIG. 2) is arranged, as a backlight, on the back side of the liquid-crystal panel 21. A lighting device 24 of the cold-cathode tube 23, a controller for controlling an overall operation of the liquid-crystal display device 12, and the like are provided inside the frame 20.

Figure 2:
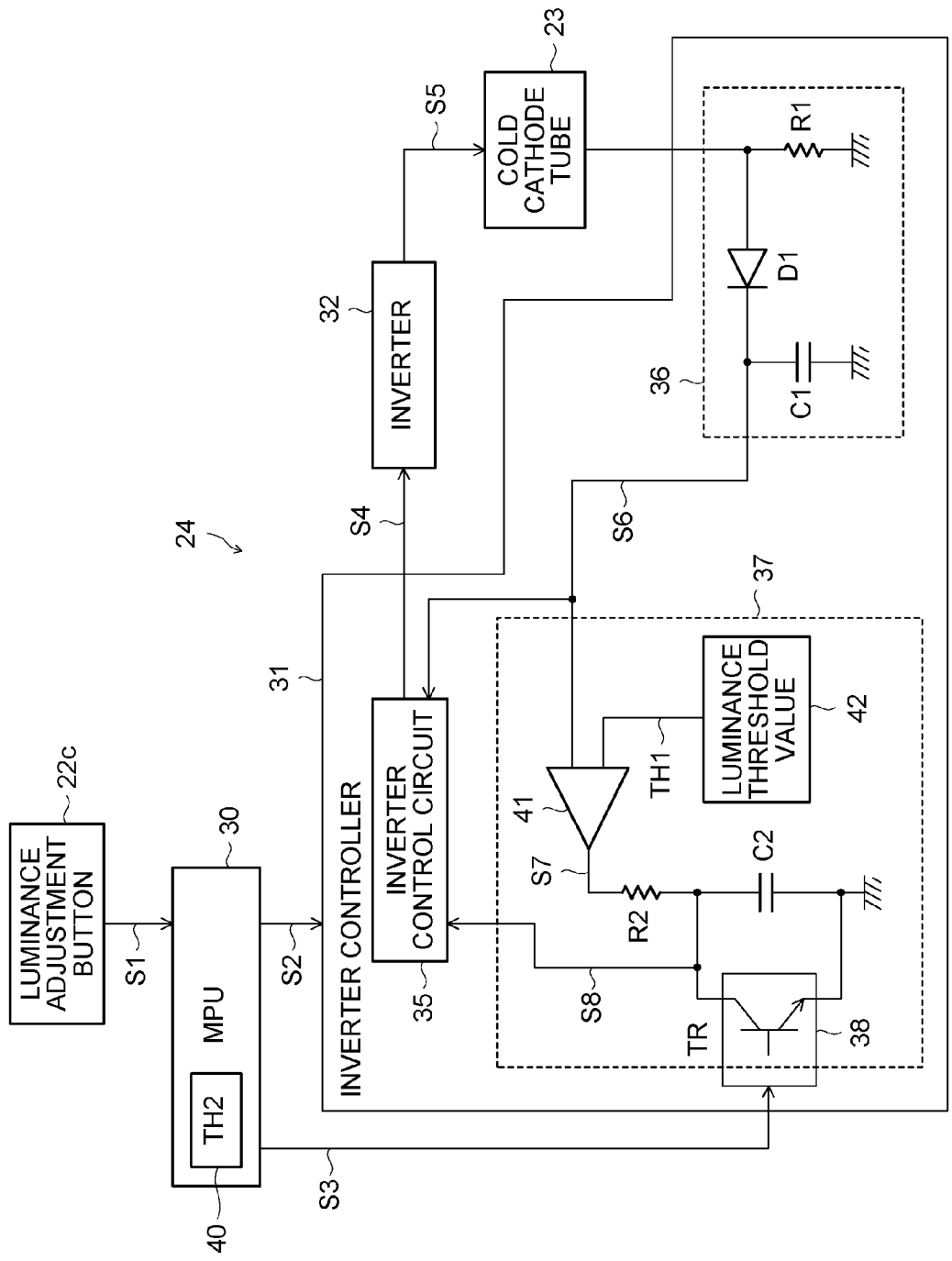
FIG. 2 is a block diagram illustrating a configuration of a lighting device of a cold-cathode tube for the liquid-crystal display device.

In FIG. 2, the lighting device 24 is configured of the MPU 30, an inverter controller 31, an inverter 32, and so on.

The MPU 30 controls the inverter controller 31 by outputting thereto a command signal S2 and a control signal S3, and performs overall control of the lighting device 24. The MPU 30 compares the luminance adjustment value S1, which is set through the luminance adjustment buttons 22c, with a luminance threshold value TH2 that is stored in a memory 40, and outputs the control signal S3 when the luminance adjustment value S1 is smaller than the luminance threshold value TH2.

The luminance threshold value TH2 is set, for example, at a level that is approximately 10% of the maximum luminance. The luminance threshold value TH2 may be set at a level within a range of a few percent to a dozen percent of the maximum luminance. Preferably, the luminance threshold value TH2 may be set in association with a set value TH1 which will be described later, i.e., slightly larger than the set value TH1. For example, when the set value TH1 is 10%, then the luminance threshold value TH2 is set at about 12%, and, when the set value TH1 is 8%, the luminance threshold value TH2 is set at about 10%.

The luminance threshold value TH2 is set to have such a value corresponding to the luminance adjustment value S1 or such a unit used for the luminance adjustment value S1.

The inverter controller 31 outputs a control signal S4 to the inverter 32 based on the command signal S2 and controls the inverter 32 so that a predetermined amount of current flows through the cold-cathode tube 23. The inverter controller 31 includes an inverter control circuit 35, a current detection circuit 36, a protective circuit 37, a protection control circuit 38, and so on. The inverter controller 31 may be formed of one or a plurality of chip components using LSIs.

The inverter control circuit 35 controls an output of the inverter 32 based on the luminance adjustment value (set value) S1 that is adjusted through the luminance adjustment buttons 22c. For controlling the luminance, the inverter control circuit 35 uses a detection signal S6 fed out from the current detection circuit 36 as a feedback signal. To be more specific, the inverter control circuit 35 feeds out the control signal S4 to the inverter 32 so that the detection signal S6, which corresponds to a current actually flowing through the cold-cathode tube 23, becomes such a value or a state corresponding to the command signal S2 outputted from the MPU 30. With this arrangement, the effective current flowing through the cold-cathode tube 23 is controlled and stabilized thereafter. The inverter control circuit 35 also performs voltage control for lighting the cold-cathode tube 23.

The command signal S2 or the control signal S4 may be such a signal that controls a duty cycle of a PWM (Pulse Width Modulation) waveform that is outputted from the inverter 32. In this case, the command signal S2 or the control signal S4 may be a PWM signal whose duty cycle can be varied. Such a PWM waveform is a rectangular waveform having, for example, a frequency sufficiently higher than that of a current i having a sine waveform which flows through the cold-cathode tube 23. Instead of the PWM waveform signal, the command signal S2 or the control signal S4 may be a DC signal having a voltage corresponding to the luminance adjustment value S1.

The current detection circuit 36 detects the current i actually flowing through the cold-cathode tube 23. According to the example illustrated in FIG. 2, a voltage v produced by the current i flowing through a resistor R1 is rectified by a diode D1 and smoothed by a capacitor C1 to thereby obtain the detection signal S6 having a DC voltage. The detection signal S6 is a voltage that is proportional to an effective value of the current i that flows through the cold-cathode tube 23. The detection signal S6 is fed into the inverter control circuit 35 and the protective circuit 37.

The protective circuit 37 stops operation of the inverter 32 when the current i that flows through the cold-cathode tube 23 becomes smaller than the set value TH1. The set value TH1 is arranged to be such a value corresponding to the current i that may not lead to a major malfunction or accident. The set value TH1 of such a kind is a value within a range by which the inverter controller 31 can control the current i allowed to flow through the cold-cathode tube 23 by the inverter 32 and, at the same time, is a value corresponding to the current i which does not lead to a malfunction even when a lead wire is broken or connectors are poorly fitted. The set value TH1 is, for example, set at a level of about 10% of the maximum luminance. Alternatively, the set value TH1 may be set at a level within a range of a few percent to a dozen percent of the maximum luminance or, instead, a range different therefrom.

According to the example illustrated in FIG. 2, in the protective circuit 37, the set value TH1 stored in a memory 42 is compared with the detection signal S6 by a comparator 41. A signal S7 is fed out when the detection signal S6 becomes smaller than the set value TH1. In other words, the detection signal S6 is fed back also to the protective circuit 37, whereupon a voltage level of the set signal S6 is monitored.

A delay circuit (integrating circuit) formed of a resistor R2 and a capacitor C2 applies a time delay to the signal S7, and a signal S8 thus delayed is fed out. The delay time, i.e., time t1 measured from when the signal S7 is outputted to when the signal S8 is outputted, is decided to be in the range between a few tenths of seconds and a few seconds. Values of the resistor R2 and the capacitor C2 are decided to have such a time constant τ. For example, if the time constant τ is assumed to be one second, the resistor R2 and the capacitor C2 are decided to have 10 MΩ and 0.1 μF, respectively.

The protection control circuit 38 performs control so that the protective circuit 37 does not operate if the luminance adjustment value S1 adjusted through the luminance adjustment buttons 22c is smaller than the luminance threshold value TH2. In other words, when the control signal S3 is outputted from the MPU 30, the protective circuit 37 is made inoperable.

Figure 3:
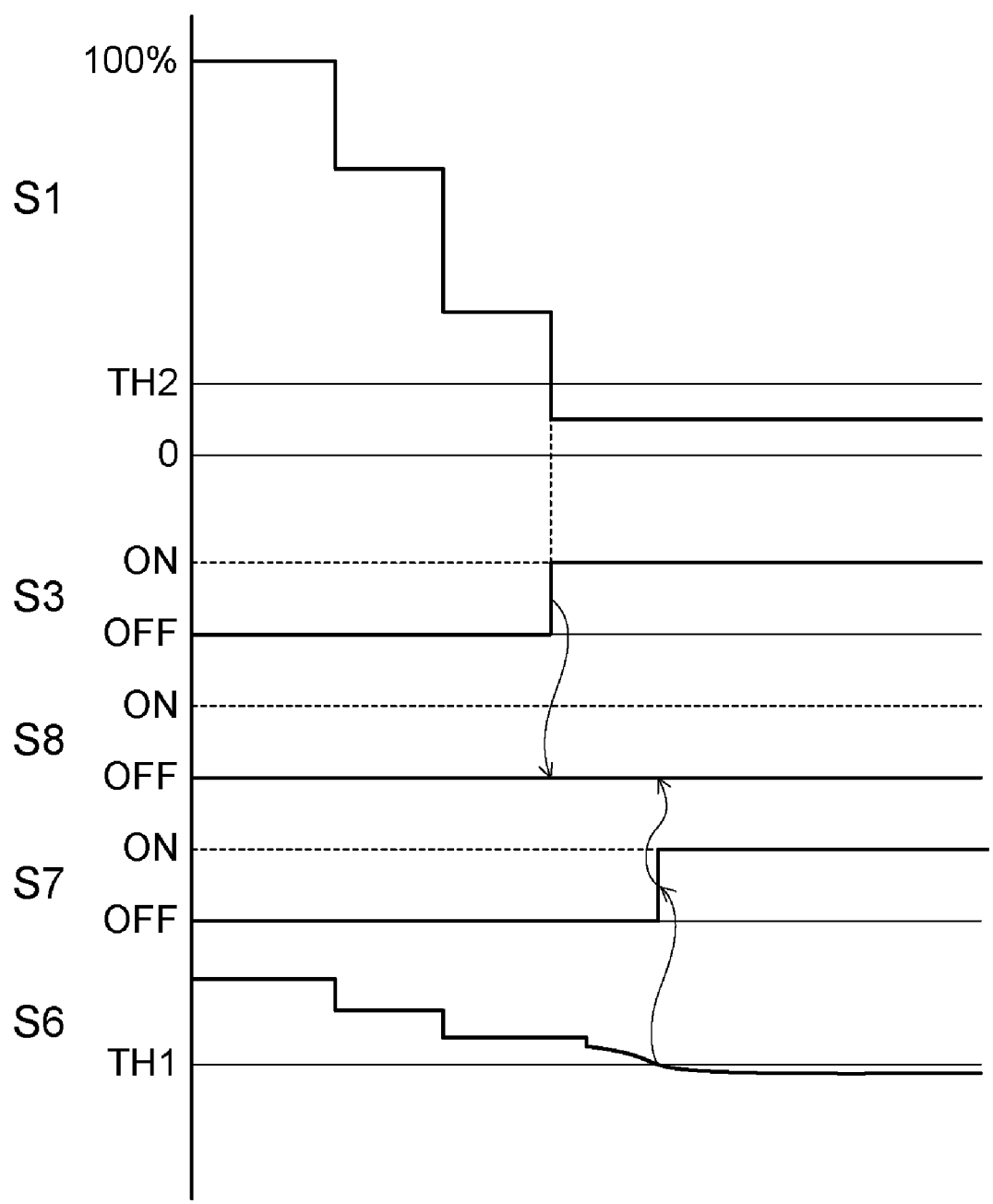
FIG. 3 is a timing chart illustrating one example of signal statuses in individual portions.

According to the example illustrated in FIG. 2, the protection control circuit 38 is formed of a transistor TR connected in such a way to make a short circuit across both ends of the capacitor C2 when the transistor TR is turned on. The transistor TR is so arranged to receive the control signal S3 at a base thereof, and the transistor TR is turned on when the control signal S3 is inputted. As illustrated in FIG. 3, when the transistor TR is turned on, regardless of the states of the detection signal S6 and the signal S7, the output of the protective circuit 37 becomes always an "L" level or "OFF", and the signal S8 is not fed out.

The inverter 32 produces a voltage for passing a current through the cold-cathode tube 23 and supplies the current i to the cold-cathode tube 23. A waveform of an output S5 of the inverter 32 is a sine wave already subjected to PWM control. When the duty cycle is varied by the control signal S4, the effective value of the sine wave is varied to thereby adjust the current i flowing through the cold-cathode tube 23.

The lighting device 24 is, for example, mounted on a single or a plurality of printed circuit boards. The lighting device 24 and the cold-cathode tube 23 are connected with each other with an appropriate lead wire and soldering. Alternatively, connectors or the like may be used.

Figure 4:
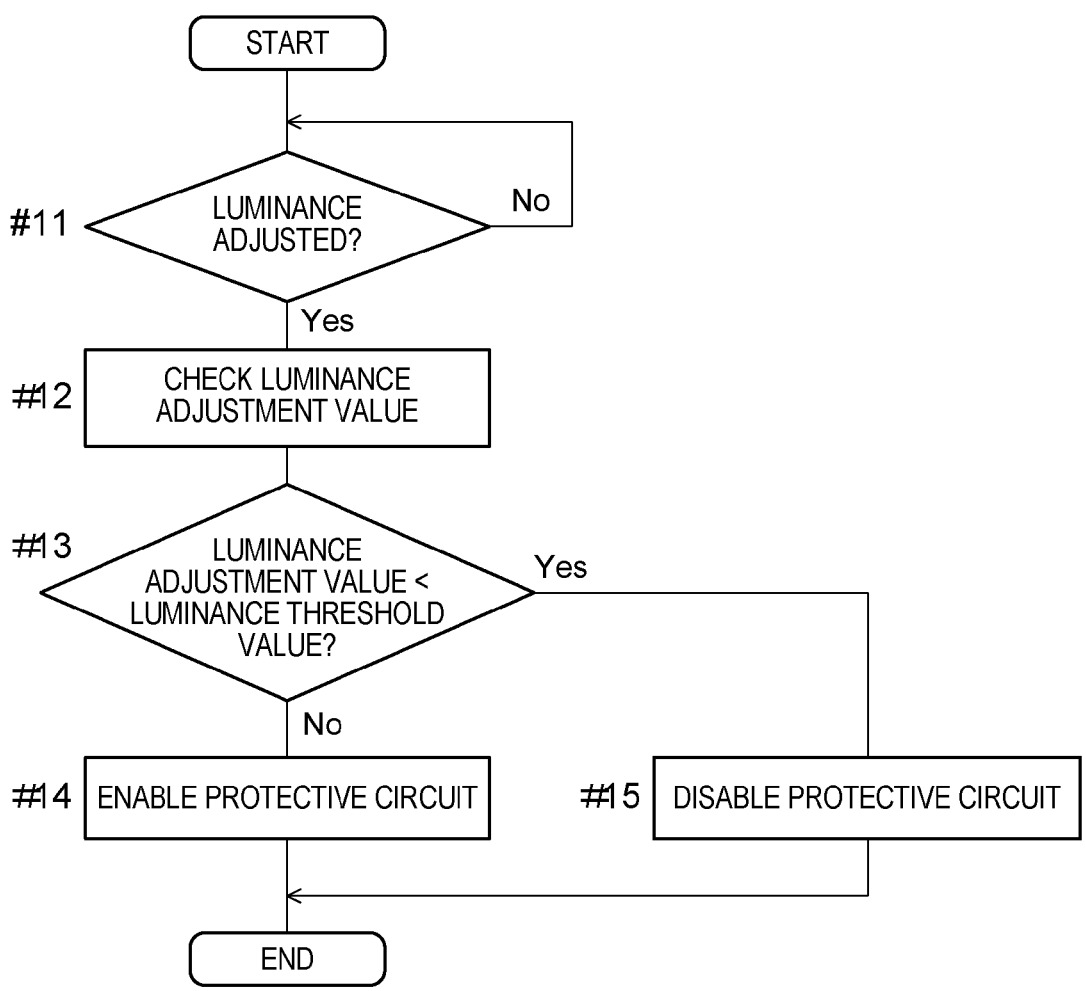
FIG. 4 is a flowchart indicating a protective control flow in the lighting device.

Referring to FIG. 4, when luminance adjustment is made through the luminance adjustment buttons 22c (Yes in #11), it is checked whether or not a luminance adjustment value is smaller than the luminance threshold value TH2 (#12). If the luminance adjustment value is not smaller than the luminance threshold value TH2 (No in #13), the protective circuit 37 is made effective (#14). If the luminance adjustment value is smaller than the luminance threshold value TH2 (Yes in #13), the protective circuit 37 is made ineffective (#15).

In this way, in this embodiment, the protection control circuit 38 is provided and performs control so that the protective circuit 37 does not operate if the luminance adjustment value S1 is smaller than the luminance threshold value TH2. Here, what is compared with the luminance threshold value TH2 is the luminance adjustment value S1 that is adjusted by the user, but is not the detection signal S6 that is detected by the current detection circuit 36. Accordingly, even if the luminance threshold value TH2 is exceptionally low, it is possible to accurately compare it with the luminance adjustment value S1, and, when the luminance adjustment value S1 becomes smaller than the luminance threshold value TH2, it is possible to realize this fact accurately. With this arrangement, even if the luminance threshold value TH2 is exceptionally low, it is possible to decide whether to make the protective circuit 37 effective or ineffective, i.e., accurately switch between the effective state and the ineffective state of the protective circuit 37.

In addition, it is also possible to arrange the range in which the luminance can be adjusted through the luminance adjustment buttons 22c exceptionally low. Moreover, if the current i flowing through the cold-cathode tube 23 is equal to or larger than the luminance threshold value TH2, the protective circuit 37 becomes effective, which makes it possible to improve an overall reliability of the display device 12.

When the luminance adjustment value is set low through the luminance adjustment buttons 22c, the protective circuit 37 is made ineffective and inoperative. In such a case, however, the output energy of the inverter 32 becomes small to thereby render the current i flowing through the cold-cathode tube 23 small. Even if a lead wire is broken or connectors are poorly fitted, this makes a small amount of increase in temperature when a discharge occurs, and therefore no smoking or malfunction is caused.

In this respect, the following describes conditions of an experiment conducted by the inventor to check the relation between the luminance adjustment value and the change in the state caused by the discharge.

A material of a printed circuit board used for the lighting device 24 is a glass epoxy board. A lead wire connecting between the cold-cathode tube 23 and the lighting device 24 is removed from a printed circuit board, and a discharge is generated between the lead wire and the printed circuit board. Then, the printed circuit board is checked for carbonization.

FIG. 5 and the following indicate the results of the experiment. As depicted in FIG. 5, when the luminance adjustment value is set at 0.14 cd/m$^2$ or 3.9 cd/m$^2$, the printed circuit board is simply warmed but not carbonized. This is because the amount of current is small even if a discharge is caused. When the luminance value is set at 8.6 cd/m$^2$, the printed circuit board is carbonized by the discharge.

According to the results, the printed circuit board is not carbonized when the luminance value is set at 3.9 cd/m$^2$ or smaller. Therefore, it can be said that, in the event that the lead wire is broken or the connectors are poorly fitted when the protective circuit 37 is made ineffective, no carbonization or malfunction may be caused. It is to be noted that this experiment indicates one example, and different results may be obtained according to another set of experimental conditions which are not used in this experiment.

In the embodiment described above, the protection control circuit 38 is arranged to bridge the two terminals of the capacitor C2 when the control signal S3 is fed therein.

Instead, it is also possible to provide a switching circuit that bypasses the protective circuit 37 itself.

In the embodiments discussed above, it is also possible to use other types of waveforms, frequencies, amplitudes, or the like for the command signal S2, the control signal S4, and the output S5 different from those described above. In addition, the overall configuration of the lighting device 24 or the display device 12, the configurations of various portions thereof, the structure, the circuitry, the shape, the size, the quantity, the waveforms, the materials thereof, and the like may be altered as appropriate in accordance with the subject matter of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method of a lighting device for a cold-cathode tube, the lighting device including:
    an inverter that supplies a current through the cold-cathode tube;
    an operation portion through which a luminance adjustment is performed;
    an inverter control circuit that controls the inverter in accordance with a luminance adjustment value adjusted through the operation portion so as to change the current flowing through the cold-cathode tube; and
    a protective circuit that stops operation of the inverter when the current flowing through the cold-cathode tube becomes smaller than a predetermined set value,
    the control method comprising;
    controlling the protective circuit such that the protective circuit does not operate when the luminance adjustment value adjusted through the operation portion is smaller than a luminance threshold value, wherein
    the protective circuit comprises a comparator that detects that the current flowing through the cold-cathode tube becomes smaller than the predetermined set value, and a delay circuit that applies a time delay to an output of the comparator,
    the delay circuit includes an integrating circuit formed of a resistor and a capacitor, and
    the protection control circuit is arranged to short across the capacitor in the delay circuit when the luminance adjustment value adjusted through the operation portion is smaller than the luminance threshold value.

2. A lighting device for a cold-cathode tube, comprising:
    an inverter that supplies a current that flows through the cold-cathode tube;
    an operation portion through which a luminance adjustment is performed;
    an inverter control circuit that controls an output of the inverter in accordance with a luminance adjustment value adjusted through the operation portion;
    a protective circuit that stops operation of the inverter when the current flowing through the cold-cathode tube becomes smaller than a predetermined set value; and
    a protection control circuit that controls the protective circuit such that the protective circuit does not operate when the luminance adjustment value adjusted through the operation portion is smaller than a luminance threshold value, wherein
    the protective circuit comprises a comparator that detects that the current flowing through the cold-cathode tube becomes smaller than the predetermined set value, and a delay circuit that applies a time delay to an output of the comparator,
    the delay circuit includes an integrating circuit formed of a resistor and a capacitor, and
    the protection control circuit is arranged to short across the capacitor in the delay circuit when the luminance adjustment value adjusted through the operation portion is smaller than the luminance threshold value.

3. A liquid-crystal display device comprising:
    a liquid-crystal panel;
    a cold-cathode tube arranged as a backlight of the liquid-crystal panel; and
    a lighting device that drives the cold-cathode tube,
    wherein the lighting device comprises:
    an inverter that supplies a current that flows through the cold-cathode tube;
    an operation portion through which a luminance adjustment is performed;
    an inverter control circuit that controls an output of the inverter in accordance with a luminance adjustment value adjusted through the operation portion;
    a protective circuit that stops operation of the inverter when the current flowing through the cold-cathode tube becomes smaller than a predetermined set value; and
    a protection control circuit that controls the protective circuit such that the protective circuit does not operate when the luminance adjustment value adjusted through the operation portion is smaller than a luminance threshold value, wherein
    the protective circuit comprises a comparator that detects that the current flowing through the cold-cathode tube becomes smaller than the predetermined set value, and a delay circuit that applies a time delay to an output of the comparator,
    the delay circuit includes an integrating circuit formed of a resistor and a capacitor, and
    the protection control circuit is arranged to short across the capacitor in the delay circuit when the luminance adjustment value adjusted through the operation portion is smaller than the luminance threshold value.

\* \* \* \* \*